United States Patent
Chu et al.

(10) Patent No.: US 8,214,644 B2
(45) Date of Patent: Jul. 3, 2012

(54) METHOD FOR INSTALLING RIGHTS OBJECT FOR CONTENT IN MEMORY CARD

(75) Inventors: Youn-Sung Chu, Gyeonggi-Do (KR); Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 12/634,667

(22) Filed: Dec. 9, 2009

(65) Prior Publication Data

US 2010/0191976 A1    Jul. 29, 2010

Related U.S. Application Data

(60) Provisional application No. 61/148,053, filed on Jan. 29, 2009, provisional application No. 61/170,113, filed on Apr. 17, 2009.

(30) Foreign Application Priority Data

Aug. 11, 2009  (KR) ......... 10-2009-0073802
Oct. 26, 2009  (KR) ......... 10-2009-0101947

(51) Int. Cl.
*H04L 9/32* (2006.01)
*G06F 11/30* (2006.01)
*G06F 12/14* (2006.01)
*G06F 7/04* (2006.01)
*G06F 17/30* (2006.01)
*H04N 7/16* (2006.01)

(52) U.S. Cl. ........ 713/170; 713/176; 713/168; 713/189; 726/26

(58) Field of Classification Search .............. None
See application file for complete search history.

(56) References Cited

U.S. PATENT DOCUMENTS

| 2005/0210249 | A1 | 9/2005 | Lee et al. |
| 2005/0216739 | A1 | 9/2005 | Lee et al. |
| 2006/0059094 | A1 | 3/2006 | Oh et al. |
| 2007/0288383 | A1 | 12/2007 | Kim et al. |
| 2008/0127177 | A1* | 5/2008 | Oh et al. ............ 717/174 |
| 2009/0006845 | A1 | 1/2009 | Charbonnier et al. |
| 2010/0049971 | A1 | 2/2010 | Oh |

FOREIGN PATENT DOCUMENTS

WO    2005/091162 A1    9/2005

OTHER PUBLICATIONS

Open Mobile Aliiance, "OMA Secure Removable Media Specificaion: Draft Version 1.0," Jan. 12, 2009.*
Open Mobile Alliance, DRM Specification, Approved Version 2.1, Nov. 6, 2008, pp. 1-214, XP007913421.

* cited by examiner

*Primary Examiner* — Kaveh Abrishamkar
*Assistant Examiner* — Robert Leung
(74) *Attorney, Agent, or Firm* — Birch, Stewart, Kolasch & Birch, LLP

(57) ABSTRACT

A method, device and system for stably issuing a rights object (RO) to a memory, namely, an SRM, via a terminal. When RO has been issued to the memory card, namely, to the SRM, by using the stable procedure, the RO can be compatible with a different terminal that does not support the stable procedure, whereby the RO can be completely used by the different terminal.

13 Claims, 9 Drawing Sheets

RELATED ART

RELATED ART

METHOD FOR INSTALLING RIGHTS OBJECT FOR CONTENT IN MEMORY CARD

CROSS REFERENCE TO RELATED APPLICATIONS

The present application is related to and claims the benefit of U.S. Provisional Applications No. 61/148,053 filed on Jan. 29, 2009 and No. 61/170,113 filed on Apr. 17, 2009, and the benefit of earlier filing date and right of priority to Korean Applications No. 10-2009-0073802, filed on Aug. 11, 2009 and No. 10-2009-0101947 filed on Oct. 26, 2009, the entire contents of which being incorporated herein by reference.

BACKGROUND OF THE INVENTION

1. Field of the Invention

The present invention relates to digital rights management (DRM) and, more particularly, to a method, device and system for directly downloading and installing a rights object in a DRM environment.

2. Description of the Related Art

Digital Rights Management (DRM) is a technology for safely protecting and systematically managing a rights object for digital contents (e.g., music, movies, literature, images, etc.). DRM prevents unauthorized and/or illegal copying of digital contents. DRM also provides for the acquisition of rights object (RO) for DRM contents, production and distribution of DRM contents, and protection and management for a series of usage processes.

FIG. 1 shows a general structure of a conventional DRM system.

The conventional DRM system controls how a user receives and processes received digital contents in accordance with a RO given to the user. In this respect, the contents provider is an entity corresponding to a contents issuer (CI) 30 and/or a rights issuer (RI) 40.

The CI 30 issues protected contents (referred to hereinafter as 'DRM contents' (or 'digital contents')) by using a particular coding key to protect the contents from viewing or processing by a non-authorized user, and the RI 40 issues the RO required for allowing use of the DRM contents.

A terminal 10 includes a DRM agent. The DRM agent receives DRM contents from the CI 30, receives a RO with respect to the contents from the RI 40, and interprets permission and/or constraint included in the RO to control the use of the DRM contents by the corresponding terminal.

In general, the RO is coded by a public key of a particular terminal, so a terminal other than a terminal having a private key cannot decode or use the DRM contents related to the RO.

Thus, in a conventional DRM system, if the RO and its associated DRM contents are stored in a mobile memory card (i.e., a secure removable memory (SRM)) such as a multimedia card and the like, a terminal other than a particular terminal for which the RO has been issued cannot read the DRM contents from the memory card (SRM). That is, the RO is dependent upon the particular terminal.

In addition, in the conventional DRM system, because the RO is issued for the particular terminal, if the memory card (SRM) stores the RO and its DRM contents, only the particular terminal having the issued RO can read the DRM contents and the RO from the SRM. Thus, only the particular terminal having the issued RO can use the DRM contents.

Also, in the conventional DRM system, the RI 40 cannot issue a RO with respect to the DRM contents to the memory card, namely, the SRM. Thus, the memory card, namely, the SRM, cannot have the RO in its name.

FIG. 2 illustrates problems according to the related art.

As shown in FIG. 2, the CI 30 issues contents a first terminal 11. The RI 40 issues RO with respect to the contents to the first terminal 11. In this case, the RO is issued in the name of the first terminal 11. The first terminal exports the RO and copies the RO into the memory card, namely, the SRM 15.

Accordingly, although the user of the first terminal 11 transfers the contents to the memory card, namely, the SRM 15, to a second terminal 12, the second terminal 12 can not use the contents because the RO is issued to the first terminal 11.

SUMMARY OF THE INVENTION

Therefore, in order to address the above matters, the various features described herein have been conceived.

An object of the present invention is to provide a method, device and system for stably issuing a rights object (RO) to a memory card, namely, an SRM, via a terminal. In addition, when the RO is issued to the memory card, namely, to the SRM, the RO can be compatibly used for a different terminal supporting the method, thus allowing the different terminal to stably use the RO.

Another object of the present invention is to directly issue a RO, which has been downloaded and installed to a memory card, namely, an SRM, to a different device while maintaining the RO's compatibility.

Still another object of the present invention is to recover from an error generated when a RO is issued to a memory card, namely, an SRM.

Yet another object of the present invention is to be able to discriminate between each of a plurality of ROs that are issued to a memory card, namely, an SRM.

To achieve the above objects, there is provided a method, device and system for having a RO issued in the name of a memory card, namely, an SRM, and installing the issued RO in the memory card via a DRM agent of a terminal. In this case, when the RO is installed in the memory card, important information such as REK, CEK, and the like, is not exposed to the terminal or to the exterior.

To achieve the above objects, there is also provided a method, device and system for allowing a terminal to receive a RO from a rights issuer (RI) on behalf of a memory card and install the received rights object in the memory card.

The method for installing the RO in the memory card includes receiving, by the terminal from the RI, a RO response message including a device ID, a protected RO, and a signature.

The method may further include determining if the device ID in the RO response message matches an ID of the memory card.

The method may further include extracting, by the terminal, from the protected RO a wrapped key material and corresponding information to generate rights information, and generating an identifier for identifying the rights information if the device ID in the RO response message matches the ID of the memory card.

The method may further include transmitting, from the terminal to the memory card, a provisioning setup request message, including the wrapped key material, the identifier and information about a size of the rights information.

The method may further include receiving, by the terminal from the memory card, a provisioning setup response message. The provisioning setup response message includes a status indicating a result of processing provisioning setup request message, a MAC key obtained by the memory card from the wrapped key material.

The rights information may include: rights meta data, a RO container, and state information.

The step of generating an identifier includes encrypting the identifier to be included in the provisioning setup request message. The identifier may be a Handle. The identifier may be coded and included in the provisioning setup request message.

The wrapped key material comprises a $K_{MAC}$ and a $K_{REK}$, wherein $K_{MAC}$ is a message authentication code key for integrity protection of the RO, and $K_{REK}$ is a rights object encryption key for confidentiality of the RO.

The protected RO includes at least one of rights, the wrapped key material and a MAC key.

The method may further include generating, by the terminal, a RO request message without a signature; sending, from the terminal to the memory card, a signature request message; receiving, by the terminal from the memory card, a signature response message containing a signature of the memory card; and sending, from the terminal to the memory card, the RO request message including the signature of the memory card to the RI.

To achieve the above objects, there is also provided a method, device and system for receiving a RO with respect to contents from an RI via a terminal.

The receiving method may include: receiving a signature query request message from the terminal. Here, the signature query request message may include RO request message.

The receiving method may further include: generating a signature with respect to the RO request message in the signature query request message and transmitting the same to the terminal to allow the terminal to transmit the RO request message to the RI on behalf of the memory card.

The receiving method may further include: receiving a provisioning setup request message including information about the size of rights information with respect to the contents received from the RI by the terminal, an identifier of the rights, and protected key information; decrypting and storing the protected key within the provisioning setup request message, and allocating a storage region by using the size information; transmitting a response message with respect to the provisioning setup request message to the terminal; and when the rights information with respect to the contents from the terminal, installing the rights in the storage region.

To achieve the above objects, there is also provided a terminal that receives RO from an RI on behalf of the memory card that can be mounted, and installs the received RO in the memory card.

The terminal may include a transmitter/receiver for receiving protected RO with respect to contents from an RI on behalf of the memory card. Here, the protected RO may include: rights with respect to the contents, a signature of the RI, and wrapped key information.

The terminal may further include: a processor for parsing the protected RO. When the parsing operation is performed, rights are extracted from the RO and converted into rights information, namely, a format to be stored in the memory card, and an identifier with respect to the rights may be generated.

The terminal may further include: a connector connected to the memory card, transmitting a provisioning setup request message including the identifier and information about the size of the rights information to the memory card, and transmitting rights provisioning request message including the rights information to the memory card in order to install the rights information in the memory card.

According to the exemplary embodiments of the present invention, the RI can stably issue RO to the memory card, namely, to the SRM. In addition, the RO stored in the SRM can be properly used by any terminal desired by the user.

Because rights provisioning is installed to be compatible with the existing SRM 1.0, DRM contents corresponding to rights in an SRM-installed device by using the conventional local rights consumption, and the like.

In the rights provisioning process, when rights are installed from a DRM agent to an SRM agent, a unique Handle for discriminating rights is allocated. Thus, when rights are used as local rights consumption and the like, the rights stored in the SRM can be clearly discriminated.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
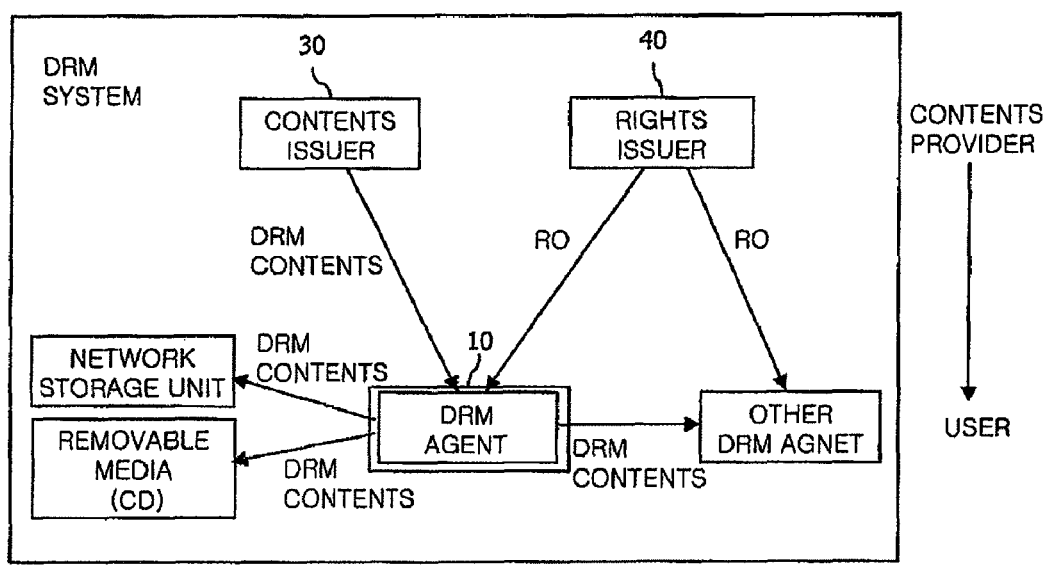
FIG. 1 illustrates the configuration a general DRM system.
Figure 2:
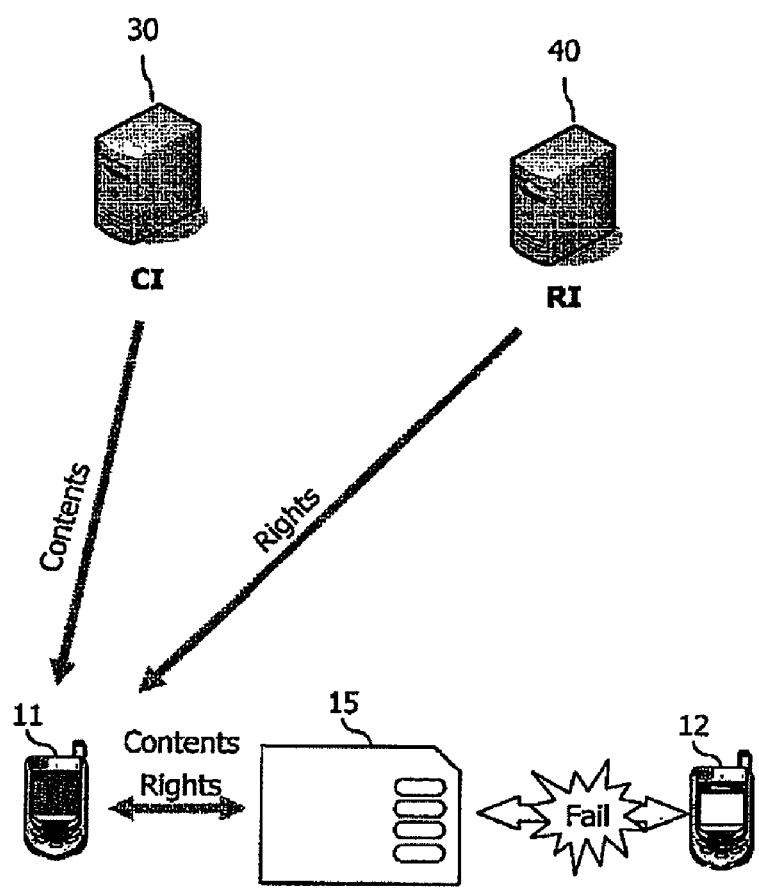
FIG. 2 illustrates problems according to the related art.

The present invention is applied for a digital rights management (DRM) system. However, without being limited thereto, the present invention can be also applicable to any other communication systems and methods and DRM-related systems and methods.

The technical terms in the description of the present invention are used for explaining particular embodiments and it should be understood that they do not limit the present invention. Unless otherwise defined, all terms used herein have the same meanings as those generally understood by those with ordinary knowledge in the field of art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present application. Also, if a technical term used in the description of the present invention is an erroneous term that fails to clearly express the idea of the present invention, it should be replaced by a technical term that can be properly understood by the skilled person in the art. In addition, general term used in the description of the present invention should be construed according to definitions in dictionaries or according to its front or rear context, and should not be construed to have an excessively restrained meaning.

The terms "a" and "an" are defined as one or more unless explicitly stated otherwise herein. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

Hereinbelow, a device is illustrated in FIGS. 3 to 7, and the device may be also called user equipment (UE), a terminal, mobile equipment (ME), or mobile station (MS). In addition, the device may be a mobile device having a communication function such as mobile phones, personal digital assistants (PDAs), smart phones, notebook computers, and the like, or may be a device that cannot be carried around such as personal computers (PCs) or a vehicle-mounted device.

DEFINITION OF TERMS

Terms used in the description of the present invention will be briefly defined to half understanding the present invention before describing the present invention with reference to the accompanying drawings.

Rights Object (RO)

Rights object is also called usage rights, including permissions (or constraints) with respect to DRM and other attributes connected to the contents.

The RO may be generally stored in a terminal or in a memory, e.g., a secure removable memory (SRM), according to an exemplary embodiment of the present invention. In this case, the RO may be stored in the form of a RO container.

An agent of the SRM handles the RO container as an opaque object. Namely, the SRM agent does not parse the RO container.

Rights

The rights comprise rights metadata, rights object container, state information and REK (or encrypted REK).

State Information

State information refers to a current state (e.g., a balance count, an interval start date) of each stateful permission within a stateful RO. If the usage rights are stateful usage rights, the state information is included within the rights.

Rights Information

Rights information include rights meta data, RO container. The Rights information further includes the state information if the RO is stateful RO.

REK

REK is a RO encryption key, having a binary form, and is no base64 encoding. The term Base64 refers to a specific MIME content transfer encoding. The term Base64 is also used as a generic term for any similar encoding scheme that encodes binary data by treating it numerically and translating it into a base 64 representation. The particular choice of base is due to the history of character set encoding: one can choose a set of 64 characters that is both part of the subset common to most encodings, and also printable. This combination leaves the data unlikely to be modified in transit through systems, such as email, which were traditionally not 8-bit clean. MIME Base64 uses A-Z, a-z, and 0-9 for the first 62 values. There are other similar systems, usually derived from Base64, that share this property but differ in the symbols chosen for the last two values; an example is UTF-7.

A data structure for a REK (Rek) is described as follows: Rek( ) {for (i=0; i<16; i++) {byte 8 uimsbf (unsigned integer most significant bit first)}}.

Handle

Handle is a random number generated by a DRM agent, which is used by the DRM agent to identify usages rights (or RO) stored in the memory card, e.g., the SRM. The Handle is used by the DRM agent to use or move the usage rights within the SRM, or to identify the usage rights (or RO). The Handle is stored in the SRM and stored in an operation log of the terminal.

When the DRM transmits a message for using or moving the usage rights (or RO), the DRM generates the Handle and transmits the Handle to the SRM.

MAKE:

MAKE stands for "Mutual Authentication And Key Exchange." The DRM Agent and the SRM Agent authenticate each other through the MAKE (i.e. mutual authentication) based on credentials that are securely provisioned in each. The result of this mutual authentication and key exchange allows the DRM Agent and SRM Agent to establish a secure channel for the exchange and sharing of secret elements.

Rights Meta Data:

Rights meta data includes a RO version, a RO alias, a RI identifier, a RI URL, a RI Alias, and a RI time stamp.

Asset ID

Asset ID stands for an "asset identifier," which is included in the RO, and is used to identify DRM contents.

Protected RO

The protected RO is a format according to DRM Version 2.0, the entire contents of which are incorporated herein by reference. The protected RO is a format used when the protected RO is provided from the RI to the terminal. In addition, the protected RO is a format used when the protected RO is transferred from the DRM agent of the terminal to the memory card, e.g., the SRM agent of the SRM.

The protected RO includes sequential RO as shown below, namely, including a <RO> element and a <mac> element including a MAC value. The <mac> element is used to check integrity and a key of the <RO> element.

TABLE 1

```
<element name="protectedRO" type="roap:ProtectedRO"
form="qualified"/>
<complexType name="ProtectedRO">
    <sequence>
        <element name="ro" type="roap:ROPayload" form="qualified"/>
        <element name="mac" type="ds:SignatureType"/>
    </sequence>
</complexType>
```

As shown in Table 1, <RO> element includes ROPayload item. The ROPayload item includes protected rights and wrapped keys. The wrapped keys are used to decrypt a coded portion of the rights. The ROPayload item includes content shown in Table 2 below:

TABLE 2

```
<!-- Rights Object Definitions -->
<complexType name="ROPayload">
    <sequence>
        <element name="riID" type="roap:Identifier"/>
        <element name="rights" type="o-ex:rightsType"/>
        <element name="signature" type="ds:SignatureType"
        minOccurs="0"/>
        <element name="timeStamp" type="dateTime" minOccurs="0"/>
        <element name="encKey" type="xenc:EncryptedKeyType"/>
        <element ref="roap:roPayloadAliases" minOccurs="0"/>
        <any processContents="lax" minOccurs="0"
        maxOccurs="unbounded"/>
    </sequence>
    <attribute name="version" type="roap:Version" use="required" />
    <attribute name="id" type="ID" use="required" />
    <attribute name="stateful" type="boolean"/>
    <attribute name="domainRO" type="boolean"/>
    <attribute name="riURL" type="anyURI"/>
</complexType>
```

An <riID> element includes an identifier for identifying an RI.

A <timestamp> element value is given by a universal coordinate time (UTC) and used to prevent hacking or cracking through retransmission.

The <Signature> element includes the signature of the RI.

An <encKey> element includes wrapped MAC key ($K_{MAC}$) REK (RO encryption key) ($K_{REK}$).

A <roPayloadAliases> element is shown in Table 3 below.

TABLE 3

```
<element name="roPayloadAliases">
    <complexType>
        <sequence>
            <element name="roAlias" type="roap:String80" minOccurs="0"/>
            <element name="domainAlias" type="roap:String80"
            minOccurs="0"/>
            <element name="riAlias" type="roap:String80"/>
            <any processContents="lax" minOccurs="0"
            maxOccurs="unbounded"/>
        </sequence>
    </complexType>
</element>
```

Meanwhile, a Nonce item includes a certain value in a rights object acquisition protocol (ROAP) protocol message. The Nonce item must be used only once. Namely, a certain value of the Nonce is generated whenever the ROAP message is generated.

```
<simpleType name="Nonce">
    <restriction base="base64Binary">
        <minLength value="14"/>
    </restriction>
</simpleType>
```

Hereinafter, exemplary embodiments of the present invention will now be described in detail with reference to the accompanying drawings.

Figure 3:
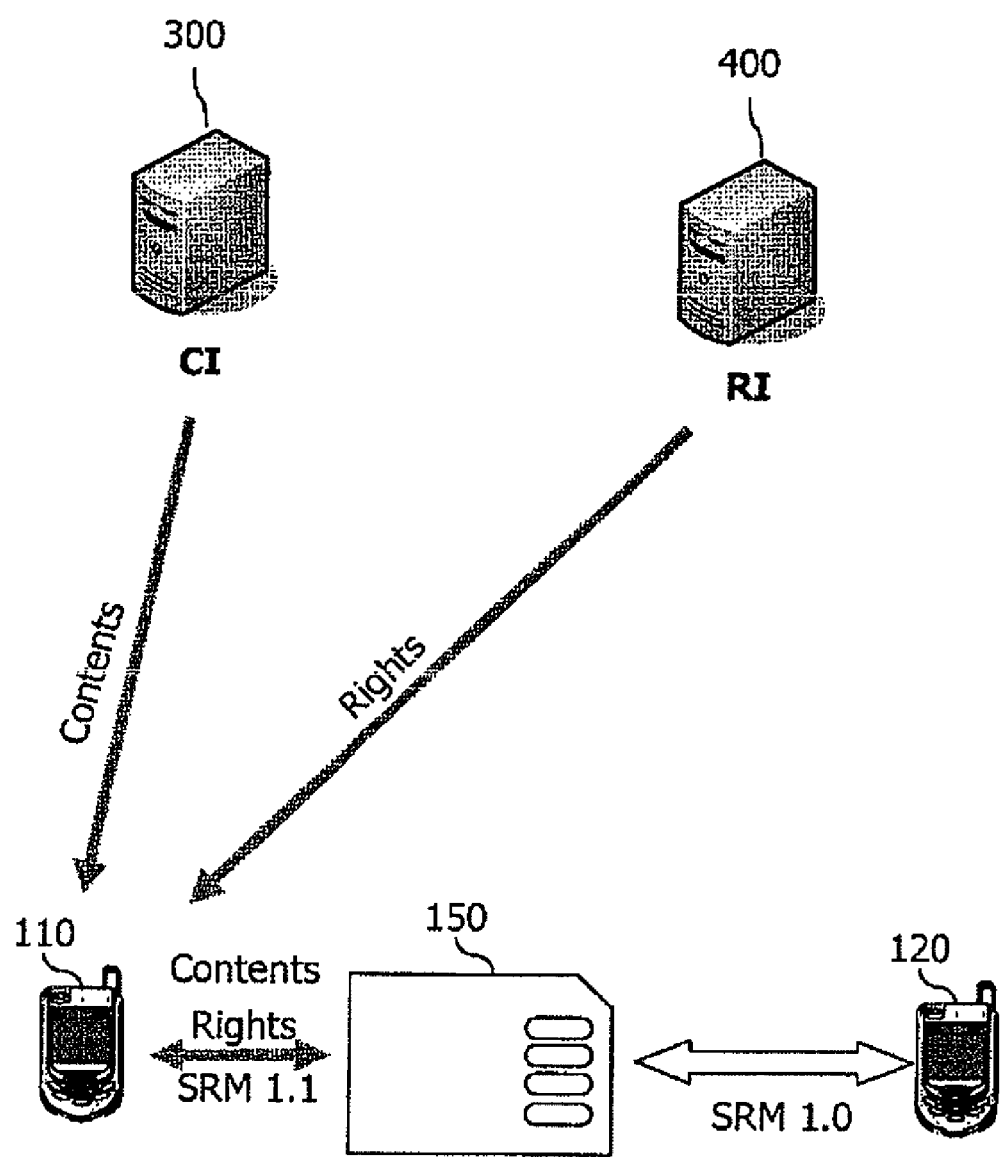
FIG. 3 illustrates the concept for issuing contents and RO to a memory card according to an exemplary embodiment of the present invention.

FIG. 3 illustrates the concept for issuing contents and RO to a memory card according to an exemplary embodiment of the present invention.

As shown in FIG. 3, a contents issuer (CI) 300 issues contents to a memory card, namely, to an SRM 150, via a first terminal 100. An RI 400 issues a RO with respect to the contents to the memory card, namely, to the SRM 150, via the first terminal 110. In this case, the RO is issued in the name of the memory card, namely, the SRM 150. The first and second terminals 110 and 120 (referred to as reference numeral 100, hereinafter) include a DRM agent, respectively. The SRM 150 includes an SRM agent.

Accordingly, when a user of the first terminal 110 transfers the memory card, namely, the SRM 150, to the second terminal 120, the second terminal 120 may use the contents with authorization.

In this case, a new protocol is defined between the DRM agent of the first terminal 110 and the SRM agent of the SRM 150 according to an exemplary embodiment of the present invention. Namely, a signing protocol required for issuing a RO in the name of the SRM agent, a provisioning setup protocol for providing the RO issued in the name of the SRM from the DRM agent to the SRM agent, and a rights provisioning protocol are proposed between the DRM agent of the first terminal 110 and the SRM agent of the SRM 150.

The exemplary embodiments of the present invention will now be described with reference to FIGS. 4 to 8.

Figure 4:
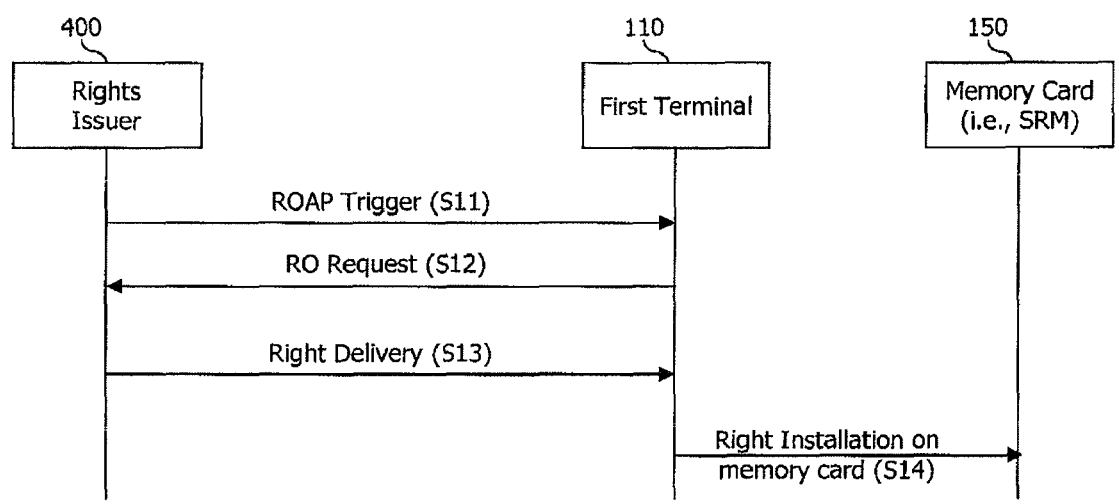
FIG. 4 is a flow chart illustrating the process of a method according to a first exemplary embodiment of the present invention

FIG. 4 is a flow chart illustrating a method according to a first exemplary embodiment of the present invention.

As shown in FIG. 4, in order to start transfer of the RO to be stored in the memory card, namely, in the SRM 150, the RI 400 transmits a trigger message (ROAP Trigger) to the first terminal 11 (S11).

Then, the first terminal 110 transmits a RO request to the RI 40 (S12).

The RI 400 transmits the RO in the name of the memory card, namely, the SRM 150, to the first terminal 110 (S13).

Then, the first terminal 110 installs the RO in the memory card, namely, in the SRM 150 (S14).

The first embodiment as described above shows a simple process of storing the RO in the memory card. A detailed process for installing the RO into the SRM 150 is explained in the second embodiment.

Explanation about the format of the RO to be installed in the SRM is described in the second embodiment, so the terminal cannot properly use the RO in the SRM 150. In addition, if the terminal supports a different format from that of the RO stored in the SRM 150, the RO cannot be read. Solutions to this problem are suggested in the second embodiment.

Furthermore, in the first embodiment, when a plurality of ROs is installed in the SRM 150, a technique is needed to discriminate a particular RO from among the plurality of ROs. Explanation about the technique is described in the second embodiment.

Also, a technique for allowing a second terminal to use the RO in the memory card is explained in the second embodiment.

Figure 5:
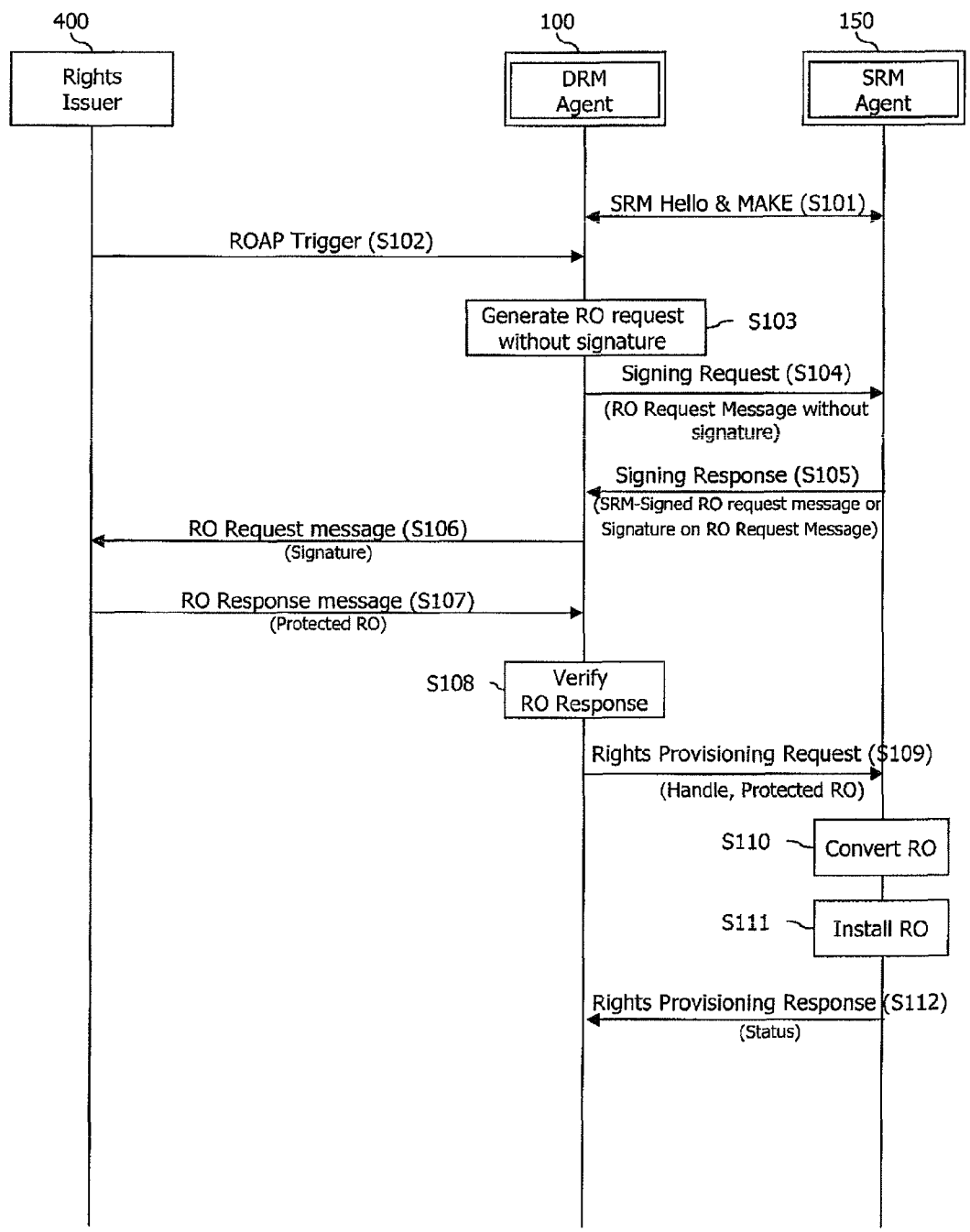
FIG. 5 is a flow chart illustrating the process of a method according to a second exemplary embodiment of the present invention.

FIG. 5 is a flow chart illustrating a method according to a second exemplary embodiment of the present invention.

As shown in FIG. 5, in the second exemplary embodiment of the present invention, when the RI 400 issues a RO (or usage rights) to the SRM 150 via the terminal 100, the RI 400 confirms the signature of the SRM 15 to authenticate the SRM. In addition, in the second exemplary embodiment of the present invention, when the RI 400 issues the RO in the same of the SRM, the RI 400 provides a protected RO to the terminal 100, so that important information, e.g., information such as REK, CEK, etc., within the RO, cannot be leaked to the terminal 100 or to the outside. However, if the protected RO is provided to and installed in the SRM 150 via the terminal 100, even when the terminal 100 wants to use the contents under authorization, the SRM 150 cannot read the RO. Thus, in the second exemplary embodiment of the present invention, the SRM 150 stably decodes and stores the protected RO. The terminal 100 is controlled to use the contents according to the RO only when there is an authorized requirement from the terminal.

This will now be described in detail with reference to the signal flow.

First, the DRM agent and the SRM agent in the SRM 150 exchange an SRM Hello Request message and an SRM Hello Response message to perform basic negotiation to establish a logical channel (S101). In this case, the negotiation includes a mutual negotiation with respect to a protocol version and a negotiation with respect to a trust anchor. Meanwhile, the DRM agent and the SRM agent perform a MAKE procedure. As mentioned above, the MAKE procedure is a mutual authentication and key exchange procedure. The MAKE procedure includes transmission of an authentication request message, reception of a response message, transmission of a key exchange request message, and reception of a corresponding response message. Through the MAKE procedure, the DRM agent and the SRM agent perform mutual authentication, perform negotiation on an encryption algorithm for formation of a secure channel, an HMAC (keyed-Hash Message Authentication Code) algorithm, and the like, and share a session key (SK) and a MAC key (MK) according to the results of the authentication. The SEM Hello and MAKE procedures follow a protocol defined in OMA SRM 1.0 TS, as it is.

In cryptography, a keyed-Hash Message Authentication Code (HMAC or KHMAC), is a type of message authentication code (MAC) calculated using a specific algorithm involving a cryptographic hash function in combination with a secret key. As with any MAC, it may be used to simultaneously verify both the data integrity and the authenticity of a message. Any iterative cryptographic hash function, such as MD5 or SHA-1, may be used in the calculation of an HMAC; the resulting MAC algorithm is termed HMAC-MD5 or HMAC-SHA1 accordingly. The cryptographic strength of the HMAC depends upon the cryptographic strength of the underlying hash function, on the size and quality of the key and the size of the hash output length in bits.

Next, the user of the SRM 100, namely, the owner, is connected to the RI via a method such as Web browsing or the like, and requests generation of a RO (or usage rights) with respect to particular contents. In requesting the generation of the RO, information about the SRM 150, e.g., SRM ID, IMSI (International Mobile Subscriber Identity), and information about the terminal 100 in which the SRM 150 is mounted, e.g., a device ID, are transferred to the RI. Then, the RI 400 transmits a trigger message, e.g., a rights object acquisition protocol (ROAP) message, to the SRM-mounted terminal 100 in order to generate a RO in the name of the SRM (S102). At this time, the RI generates a RO (or usage objects) with respect to the particular contents. The generation of the RO may be made before the ROAP trigger message is transmitted. Or, the generation of the RO may be performed after the RO request message is received from the terminal 100.

When the ROAP trigger message for direct provisioning of rights to the SRM is received, the DRM Agent checks for the presence of the <srmID> element in the ROAP trigger message. If the ROAP trigger message has the <srmID> element, the DRM Agent compares the <srmID> element in the ROAP trigger message with a <srmID> element stored in the DRM Agent. There are two possible outcomes of this comparison.

First, if the <srmID> element of the ROAP trigger message matches a <srmID> element stored in the DRM Agent, the DRM Agent generates the RO Request message (S103) for the SRM and stores the RO Request message in the DRM Agent. The RO Request message will not include the signature of the DRM Agent because the RO is intended to be downloaded and installed to the SRM.

Then, the DRM Agent sends a Signature Query Request message to the SRM Agent (S104). The Signature Query Request message includes the RO Request message without any signature. Instead, the RO request message includes an HMAC value. The HMAC value guarantees that the RO request message has not been changed while having been transmitted from the DRM agent to the SRM agent. The HMAC value is generated by using a HMAC algorithm negotiated between the DRM agent and the SRM agent. The HMAC algorithm uses HMAC-SHA1-128, the entire contents of which being incorporated herein by reference.

After receiving the Signature Query Request message, the SRM Agent generates the signature for inclusion in the RO Request message.

Alternatively, if the <srmID> element of the ROAP trigger message does not match the <srmID> element stored in the DRM Agent, the DRM Agent ignores the ROAP trigger message.

With this process, the SRM agent performs integrity verification on the RO request message and includes the SRM agent's signature in the RO request message in the sense that the SRM agent itself requests the RO from the RI 400. In this case, the SRM agent may transmit only the SRM agent's signature value to the DRM agent or may include the SRM agent's signature in a signature part of the RO request message. The SRM agent transmits a signature response message with respect to the signature request to the DRM agent. The signature response message includes a RO request message including the signature. Or, the signature response message may include only the signature value.

The RO request message including the signature or the signature should have integrity. To this end, the RO request message or the signature includes an HMAC value. The HMAC value guarantees the RO request message or the signature has not been changed while having been transmitted. The HMAC value is generated by using an HMAC algorithm negotiated between the DRM agent and the SRM agent. The HMAC algorithm uses HMAC-SHA1-128, the entire contents of which being incorporated herein by reference.

As noted above, the DRM agent receives the signature response message from the SRM agent. The signature response message includes the signature or includes the signed RO request message. Then, the DRM agent transmits the RO request message including the signature of the SRM to the RI 400 (S106).

When the RI 400 receives the RO request message, RI 400 transmits a previously generated RO in the form of a protected RO to the DRM agent (S107). Or, when the RI 400 receives the RO request message, RI 400 generates the RO and transmits the RO in the form of the protected RO. In this case, the RO may be included in a RO response message and transmitted. The RO response message includes the signature of the RI 400. The RO request message and the RO response message each follow a protocol of DRM 2.0 or a protocol of DRM 2.1.

When the RO response message is received from the RI 400, the DRM agent verifies the RO response message (S108). If the DRM Agent receives RO Response message with "Success" as the status, the DRM Agent performs the following procedure: a) verify the signature of the RO Response message; and b) if the signature is valid, check the device ID in the RO Response message. If the device ID matches the SRM ID of the memory card, then the DRM Agent extracts the rights from the protected RO in the RO Response message. With this procedure, the DRM agent verifies the signature included in the RO response message to thereby confirm that the RO response message has been generated by the RI 400 and has not been changed during its transmission.

Subsequently, the DRM agent generates a new Handle value to discriminate rights to be stored in the SRM 150. The DRM agent extracts a protected RO from the RO response message. The DRM agent transmits another RO request message (e.g., rights provisioning request message) including the protected RO and the Handle value to the SRM agents of the SRM 150 (S109). When the protected RO is a stateful RO, the RO request message includes state information. In addition, the RO request message includes data required for the protected RO to be installed. The protected RO should have integrity. To this end, the RO request message includes a HMAC value. Meanwhile, the Handle requests security. Namely, the Handle is encrypted for security. For the encryption, an encryption algorithm negotiated between the DRM agent and the SRM agent is used. In general, as the encryption algorithm, an Advanced Encryption Standard (AES) algorithm is used.

When the SRM agent receives the RO request message, the SRM agent converts the protected RO (S110). For example, the SRM agent converts the protected RO into a format corresponding to the SRM 1.0 version. The reason for converting the protected RO into the format corresponding to the SRM 1.0 is to maintain compatibility when the SRM 150 is mounted in a terminal other than the terminal 100. Namely, contents can be smoothly used through a different terminal by using the rights within the SRM 150. The conversion will now be described in detail. The SRM agent extracts an <ro> element, a <mac> element, an <encryptedKey> element from the protected RO. And the SRM agent extracts a MAC Key ($K_{MAC}$) and a RO encryption key ($K_{REK}$) from <encryptedKey> element. This can be easily understood by the person in the art from the description of Table 1 to Table 3 as described above, so a detailed description will be omitted.

Next, the SRM agent installs the rights (S111).

When the rights are properly installed, the SRM agent transmits the RO response message to the DRM agent. In this case, the RO response message includes a status parameter. The status parameter is set as 'Success' to inform that the installation has been successful. The RO response message needs to have integrity. To this end, the RO response message includes a HMAC value.

Figure 6:
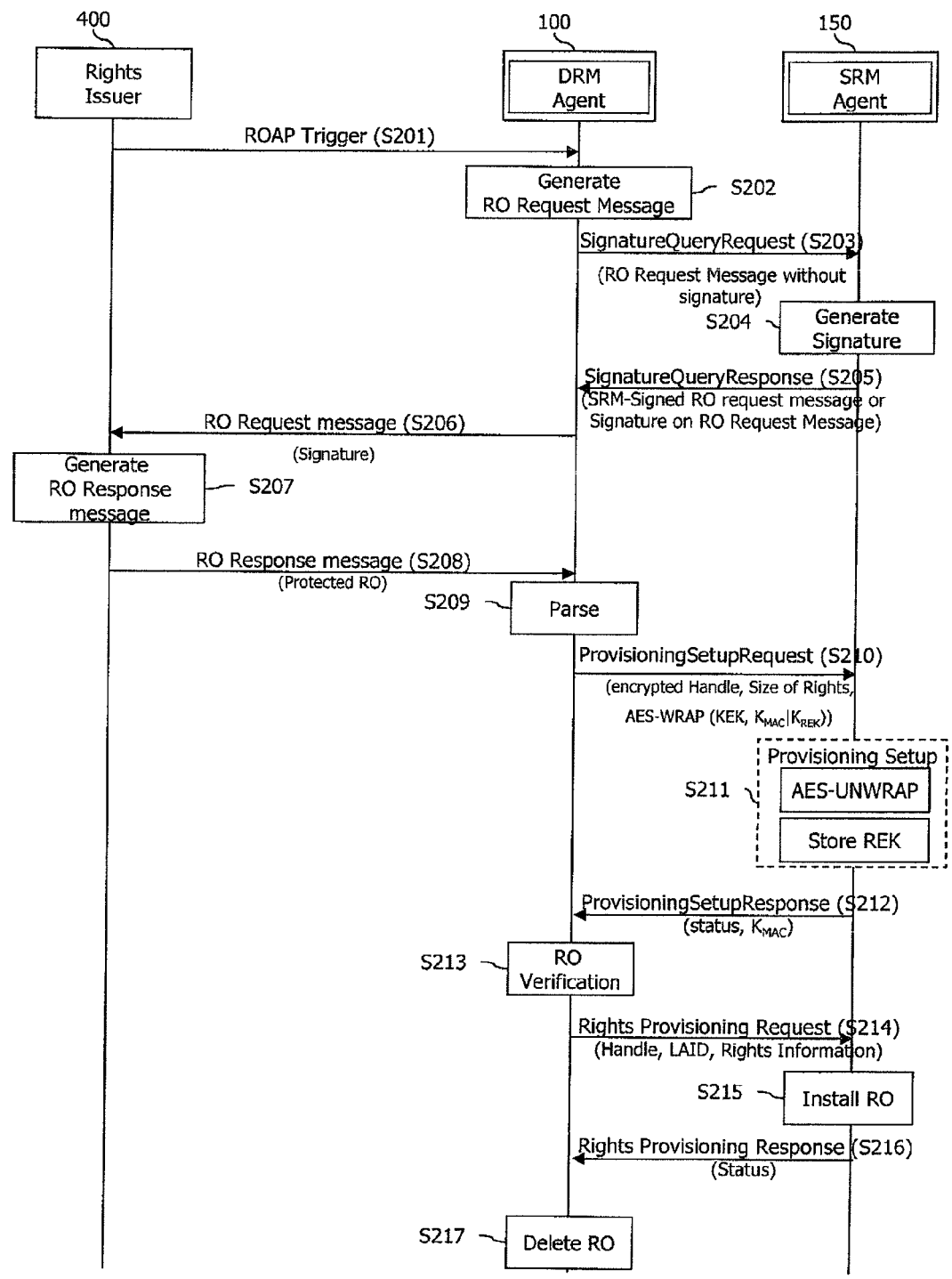
FIG. 6 is a flow chart illustrating the process of a method according to a third exemplary embodiment of the present invention.

FIG. 6 is a flow chart illustrating the process of a method according to a third exemplary embodiment of the present invention.

As shown in FIG. 6, in the third exemplary embodiment of the present invention, when the RI 400 issues a RO in the same of the SRM, the RI 400 provides a protected RO to the terminal 100 and the DRM agent of the terminal 100 stably decodes and stores the protected RO and provides the protected RO to the SRM 150. In this case, the important information within the protected RO, e.g., REK or CEK is not leaked to the DRM agent. When the rights are successfully installed in the SRM 150, the DRM agent deletes the stored rights. A detailed description will now be described with reference to the accompanying drawings.

Steps S201 and S202 are the same as steps S102 and S103 of the second exemplary embodiment illustrated in FIG. 5.

When the DRM agent requests a signature when the DRM agent transmits the generated RO request message to the SRM (S203). The signature request is achieved by transmitting a signature query request message, e.g., a signature query request message. The signature query request message may include a RO request message without a signature. The signature query request message includes items shown in Table 4 below:

TABLE 4

| Field | Description |
| --- | --- |
| RO Request | RO request message |
| Signature scheme | Signature schema negotiated between the RI 400 and the terminal |

Meanwhile, the RO request message needs to have integrity. To this end, the RO request message includes a HMAC value. The Signature scheme parameter needs to have integrity protection. To this end, the RO request message includes a HMAC value.

After the SRM agent performs integrity verification on the RO request message, the SRM agent generates its digital signature (S204).

The SRM agent includes its signature in the RO request message in the sense that the SRM agent itself requests the RO from the RI 400. In this case, the SRM agent may transmit only its signature value to the DRM agent or may include the SRM agent's signature in a signature part of the RO request message. The SRM agent transmits a signature query response message to the DRM agent (S205). The signature query response message includes a RO request message including the signature. Or, the signature query response message may include only the signature value. The signature query response message includes items as shown in Table 5 below:

TABLE 5

| Fields | Description |
| --- | --- |
| Status | Status field may be included only when processing results of the signature query request message has an error |
| Signature of RO request | Digital signature of the SRM with respect to the RO request message generated by using the private key of the SRM |

Meanwhile, the Status parameter needs to have integrity protection. To this end, the RO request message includes a HMAC value.

The status field may include the values as shown in Table 6 below:

TABLE 6

| Status value | Description |
| --- | --- |
| Success | Status is successful |
| Signature scheme not supported | Signature schema is not supported by the SRM agent |
| Parameter failed | The length or structure of a field is inaccurate |
| Unexpected request | Received out of turn or not allowed |
| Unknown error | Other error |

The RO request message including the signature or the signature needs to have integrity. To this end, the RO request message or the signature includes an HMAC value.

The RI 400 generates a RO response message (S207).

Subsequently, the RI 400 transmits the RO response message to the DRM agent (S208). In this case, the RI 400 includes a previously generated or currently generated RO in the form of a protected RO in the RO response message. The RO response message includes the signature of the RI 400. The RO request message and the RO response message follows a protocol of the OMA DRM (Open Mobile Alliance Digital Rights Management) 2.0 or a protocol of the OMA DRM 2.1, the contents of which are incorporated herein by reference.

If the DRM Agent receives a RO Response message with "Success" as the status, the DRM Agent performs the following procedure: a) verify the signature of the RO Response message; and b) if the signature is valid, check the device ID in the RO Response message. If the device ID in the RO Response message matches the SRM ID stored in the DRM Agent, then the DRM Agent extracts the rights from the protected RO in the RO Response message.

Accordingly, the DRM agent verifies the received RO response message and parses the received RO response message (S209). Namely, through parsing, the DRM agent decodes the protected RO. This will now be described in detail as follows.

First, the DRM agent extracts rights to be installed in the SRM 150 from the RO response message and converts the extracted rights into rights information, namely, a format to be stored in the SRM 150. The rights information includes rights meta data, and RO container as shown in Table 7 below. Also, the rights information may further include state information if the RO is stateful RO.

TABLE 7

Rights Meta Data
  Rights Object Version: <protectedRO> element::<ro> element::<version> element.
  RO Alias: <protectedRO> element::<ro> element::<roPayloadAliases>::<roAlias> element.
  RI Identifier: <protectedRO> element::<ro> element::<riID> element.
  RI URL: <protectedRO> element::<ro> element::<riURL> element.
  RI Alias: <protectedRO> element::<ro> element::<roPayloadAliases> element::<riAlias> element.
  RI Time Stamp: <protectedRO> element::<ro> element::<timeStamp> element.
  Rights Object Container
  <rights> element: <protectedRO> element::<ro> element:::<rights> element.
  <signature> element: <protectedRO> element::<ro> element::<signature> element.
State Information
If the RO is a stateful RO, the DRM agent generates state information for the SRM agent.
In this case, the state information is filled such that RO, which has been issued by the RI 400 to the SRM, remains non-used.

Subsequently, the DRM agent measures the size of the generated rights information.

And then, the DRM agent extracts a wrapped key material from the protected RO within the RO response message. The wrapped key material may be encrypted by using a public key of the SRM agent. The DRM agent transfers a Rights Provisioning Setup message including the wrapped key material (including $K_{MAC}$ and $K_{REK}$), because the DRM agent cannot decrypt the wrapped key material which is encrypted by using the public key of the SRM agent. The wrapped key material includes a <protectedRO> element::a <ro> element::a <enKey> element::a <xenc:CipherData> element::<xenc:Ciphervalue> element. The symbol '::' indicates one or more sub elements. In other words, the <protectedRO> element includes the <ro> element, and the <ro> element includes the <encKey> element.

Thereafter, the DRM agent randomly generates a Handle to identify rights to be installed in the SRM.

The DRM agent generates a provisioning setup request message and transmits the provisioning setup request message to the SRM agent (S210). The provisioning setup request message includes the Handle, size, the wrapped key material. In detail, the provisioning setup request message includes fields shown in Table 8 below:

TABLE 8

| Field | Description |
| --- | --- |
| Handle | The Handle is used to identify rights stored in the SRM. The Handle has 10 bytes, which is randomly generated by the DRM agent. Particular rights may be selected from among rights stored in the SRM through the Handle to use contents. The Handle is encrypted to be included. |
| Size | The size of the rights, indicating the size of rights information to be stored in the SRM agent. The rights information includes rights meta data, RO container and state information. |
| Wrapped key material | Wrapped key material includes MAC key, $K_{MAC}$, REK, and $K_{REK}$. Wrapped key material has the same value as C value included in the RO Response message. The C value corresponds to <protectedRO> element:: <ro> element :: <encKey> element:: <xenc:CipherData> element :: <xenc:Ciphervalue> element. |

The SRM agent receives the provisioning setup request message from the DRM agent and performs a provisioning setup procedure (S211).

In detail, the SRM agent decodes (decrypts) the wrapped key material and acquires the values $K_{MAC}|K_{REK}$ by decoding the AES-WRAP (KEK, $K_{MAC}|K_{REK}$) with a private key of the SRM agent.

The SRM Agent splits the C value into $C_1$ and $C_2$ and acquires value $c_1$ by using the $C_1$ value and a function of an Octet-String-to-Integer primitive OS2IP( ). And the SRM Agent decodes (or decrypts) the $c_1$ value by using the private key of the SRM and an acquired Z value.

$$C_1|C_2=C$$

$$c_1=\text{OS2IP}(C_1,m\text{Len})$$

$$Z=RSA.\text{DECRYPT}(\text{PrivKey}SRM,c1)=c1d \bmod m$$

Here, $K_{MAC}$ and $K_{REK}$ are each 128-bit long keys generated randomly by the sender. $K_{REK}$ ("Rights Object Encryption Key") is the wrapping key for the content-encryption key $K_{CEK}$ in Rights Objects. $K_{MAC}$ is used for key confirmation of the message carrying $K_{REK}$.

The asymmetric encryption scheme RSAES-KEM-KWS shall be used with the AES-WRAP symmetric-key wrapping scheme to securely transmit $K_{MAC}$ and $K_{REK}$ to a recipient Device using the Device's RSA public key (in this case, SRM Agent's RSA public key). An independent random value Z as described in DRM 2.1 TS section 7.1.1 shall be chosen for each encryption operation. For the AES-WRAP scheme, $K_{MAC}$ and $K_{REK}$ are concatenated to form K, i.e.:

KEK=KDF(I2OSP(Z,mLen),NULL,kekLen)

$C_2$=AES-WRAP(KEK,$K_{MAC}|K_{REK}$)

$C_1$=I2OSP(RSA.ENCRYPT(PubKey Device,Z),mLen)

C=$C_1|C_2$ where KEK is derived by KDF (Key Derivation Function as defined in DRM 2.1 TS section 7.1.2) as above. The KEK (Key Encyrption Key) is used for AES key wrapping of $K_{MAC}$ and $K_{REK}$.

Here, the parameter $C_2$ is AES wrapped key value of the $K_{MAC}$ and the $K_{REK}$ with the KEK. The parameter $C_1$ is encypted value of the random value Z with the Device's RSA public key (In this invention, SRM's RSA public key). The encrypted valude (Integer) is converted to Octec String. The parameter C is concatenation of the parameters $C_1$ and the $C_2$.

The function of OS2IP( ) is used to convert an octet string to a nonnegative integer. This function is defined in "PKCS #1 v2.1: RSA Cryptography Standard". RSA Laboratories. June 2002. http://www.rsasecurity.com/rsalabs, the entire contents of which being incorporated herein by reference.

The SRM agent uses the Z value calculated above in a function of KDF( ) as shown below to thereby acquire KEK.

KEK=KDF(I2OSP(Z,mLen),NULL,kekLen)

Here, inputs of the AES-UNWRAP( ) are KEK and $C_2$.

$K_{MAC}|K_{REK}$=AES-UNWRAP(KEK,$C_2$)

wherein KDF is equivalent to the key derivation function KDF2 defined in [X9.44] (and KDF in [X9.42], [X9.63]). It is defined as a simple key derivation function based on a hash function. For the purposes of this specification, the hash function shall be SHA-1.

KDF takes three parameters: the shared secret value Z: an octet string of (essentially) arbitrary length, otherInfo: other information for key derivation, an octet string of (essentially) arbitrary length (may be the empty string), and kLen: intended length in octets of the keying material. kLen shall be an integer, at most $(2^{32}-1)$hLen where hLen is the length of the hash function output in octets. The output from KDF is the key material K, an octet string of length kLen. The operation of KDF is as follows (note that "⌈n⌉" below denotes the smallest integer larger than, or equal to, n):

1) Let T be the empty string.
2) For counter from 1 to ⌈kLen/hLen⌉, do the following:
    Let D=4-byte, unsigned big-endian representation of counter[1]
    [1]Example: If counter=946, D will 00 00 03 b2
    Let T=T|Hash(Z|D|otherInfo).
3) Output the first kLen octets of T as the derived key K.

The SRM agent stores the value $K_{REK}$ (REK) from the decrypted $K_{MAC}$ and $K_{REK}$. The value REK is used to decode a coded CEK transferred via a <rights> element of the RO container included in the rights provisioning request message, e.g., the rights provisioning request, which is scheduled to be received from the DRM agent.

The SRM Agent reserves a region for the Handle included in the provisioning setup request message, e.g., the Provisioning Setup Request, which has been received from the DRM agent, in the SRM, and transmits a provisioning setup response message to the DRM agent (S212). In this case, a region for the Handle, and REK is reserved, and when the rights provisioning request message, e.g., Rights Provisioning Request, is received from the DRM agent afterwards, the Handle is stored together with the rights information included in the rights provisioning request message.

The provisioning setup response message includes fields as shown in Table 9 below:

TABLE 9

| Field | Description |
| --- | --- |
| Status | The values of status according to processing results of provisioning setup request message are as shown in Table 10 below |
| $K_{MAC}$ | MAC key for verifying integrity of rights issued by the RI 400 to the SRM |

In this case, if the SRM agent successfully completes the preparation for setting up the provisioning, the SRM agent includes a value indicating 'Success' in the status field. Also, the SRM agent includes the $K_{MAC}$ value in the $K_{MAC}$ field. Through the received $K_{MAC}$, integrity of the protected RO can be confirmed, as described below.

In cryptography, a message authentication code (often MAC) is a short piece of information used to authenticate a message. A MAC algorithm, sometimes called a keyed (cryptographic) hash function, accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content.

If the SRM agent fails the preparation for setting up the provisioning, the SRM agent includes a corresponding error as shown in Table 10 below in the status field and transfers the same.

TABLE 10

| Status value | Description |
| --- | --- |
| Success | Provision setup request has been successfully processed |
| Field integrity verification failed | HMAC value of provisioning setup request message is inconsistent with HMAC value generated by the SRM agent |
| Duplicate handle | The SRM already has the same rights related to the Handle |
| Not enough space | There is no extra storage space corresponding to Size of Rights in the SRM |
| Parameter failed | There is a problem in the structure or length of the provisioning setup request message |
| Unexpected request | Provisioning setup request has been received in an erroneous order or Provisioning setup request was a message not allowed |
| Unknown error | Unknown error has occurred |

When the DRM agent receives the provisioning setup response message, the DRM agent verifies the RO (S213). In detail, the DRM agent verifies that the protected RO has not been changed while the DRM agent was being received from the RI 400 through the $K_{MAC}$ included in the provisioning setup response message. Through the verification process, the DRM agent ascertains that the <rights> element, $K_{MAC}|K_{REK}$, included in the <ro> element in the protected RO has been properly transferred. The DRM agent performs the verification operation on the protected RO on behalf of the SRM agent, and if the corresponding verification result is proper, the DRM agent performs rights provisioning procedure.

In order to perform the rights provisioning procedure, the DRM agent transmits a rights provisioning setup request message to the SRM agent (S214).

The rights provisioning setup request message includes a Handle that has been reserved in the SRM by transmitting the provisioning setup request message. The Handle may be encrypted. In addition, the rights provisioning setup request message includes a list of asset ID (LAID) and rights information. In this case, the DRM agent changes the RO that has been transferred from the RI 400 into a format that can be recognized by the SRM agent and includes the LAID and the rights information in the message. The format that can be recognized by the SRM agent may be an SRM 1.0 format.

The rights provisioning setup request message may include fields as shown in Table 11 below:

TABLE 11

| Field | Description |
| --- | --- |
| Handle | Handle is used to discriminate a plurality of rights stored in the SRM. The Handle, which may have 10 bytes, is randomly generated by the DRM agent. The DRM agent identifies and selects particular rights from among the plurality of rights through the Handle, and uses contents through the rights. The Handle has the same value as the Handle included in the provisioning setup request message. |
| LAID | LAID (List of Asset ID) is a hash value of an Asset ID list related to corresponding rights. |
| Rights information | Rights information includes rights meta data, the RO container, and the state information. The rights meta data may include a RO version, a RO Alias, a RI identifier, a RI URI, a RI Alias, and a RI timestamp. The RO container includes <rights> element and <signature> element. When the RO is a stateful RO, the Rights information includes state information |

When the rights provisioning setup request message is received, the SRM Agent installs the Rights in the SRM. For the installation, the SRM Agent performs the following procedure: a) verify the integrity of the request fields; b) decrypt the handle with the session key; and c) compare the handle with the handle in the Provisioning Setup Request message. Upon successful verification and comparison, the SRM agent stores the Handle and the Rights Information included in the message in the SRM (S215). And the SRM agent updates a Handle list. Through updating of the Handle list, the Handle can be recognized even when the SRM is mounted in a different terminal. The information stored in the SRM is as shown in Table 12 below:

TABLE 12

| Handle | Rights Information | LAID | REK |
| --- | --- | --- | --- |

When the installation is completed, the SRM agent transmits a rights provisioning response message to the DRM agent (S216).

The rights provisioning response message may include the field as shown in Table 13 below:

TABLE 13

| Field | Description |
| --- | --- |
| Status | Status indicates the processing results of the rights provisioning request message. The status values are defined in Table 13 |

The values of the status are described in Table 14 below:

TABLE 14

| Status value | Description |
| --- | --- |
| Success | Rights provisioning request message has been successfully processed |
| Field Integrity Verification Failed | HMAC value of the rights provisioning request message is inconsistent with HMAC value generated by the SRM agent |
| Handle Not Found | Handle included in rights provisioning request message is not found in SRM |
| Handle Inconsistent | Handle included in rights provisioning request message is different from Handle included in rights provisioning request message |
| Not enough space | There is no extra storage space corresponding to Size of Rights in the SRM |
| Parameter failed | There is a problem in the structure or length of the rights provisioning request message |
| Unexpected request | Rights provisioning request message has been received in an erroneous order or Rights provisioning request message was a message not allowed |
| Unknown error | Unknown error has occurred |

When the rights provisioning response message is received, the DRM agent determines whether or not the installation is successful, and if the installation is successful, the DRM agent deletes RO the DRM agent has stored (S217). In detail, the DRM agent checks whether or not the value of the Status field of the rights provisioning response message is 'Success'.

Figure 7:
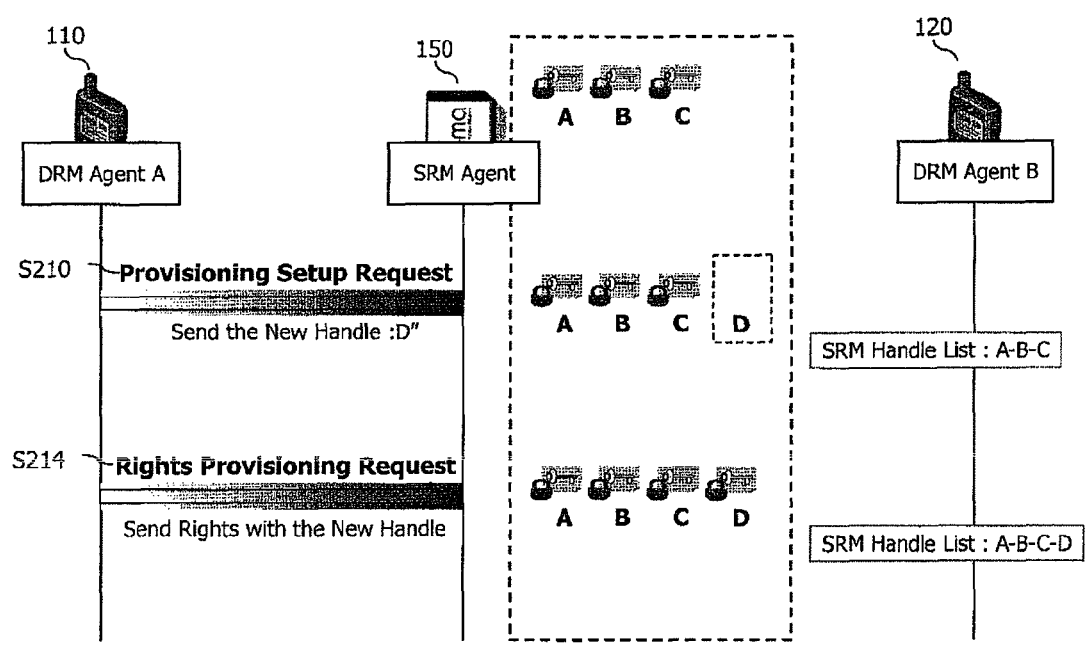
FIG. 7 is a flow chart illustrating steps S210 and S214 in FIG. 6 in detail.

FIG. 7 is a flow chart illustrating steps S210 and S214 in FIG. 6 in detail.

It is assumed that there are three Handles A, B and C and the relevant rights exist in the SRM agent.

The DRM agent A 110 transmits Provisioning Setup Request including a Handle 'D' to the SRM agent in order to provide Rights to the SRM agent (S210).

Upon receiving the Provisioning Setup Request, the SRM agent reserves a space for the Handle 'D' transferred from the DRM agent A 110, and checks whether there is an extra space for storing the rights in the SRM by the value of the size transmitted together. If the SRM is separated from the DRM agent A 110 and mounted in the DRM agent B 120, the DRM agent B 120 does not recognize the Handle D in the Handle list. Namely, the Handle D has been merely reserved, not actually stored.

The DRM agent A 110 receives a Rights Provisioning Request message (S214). Then, the DRM agent A 110 checks whether the Handle included in the Rights Provisioning Request message is identical to a previously received Handle within the Provisioning Setup Request message. If they are identical, the SRM agent stores the rights included in the Rights Provisioning Request message. And the SRM agent stores the Handle in the previously reserved region and activates the Handle. And then, the SRM agent updates the Handle list. In this case, when the SRM is separated from the DRM agent A 110 and inserted into the DRM agent B 120, the DRM agent B 120 recognizes the Handle D in the Handle list.

Figure 8:
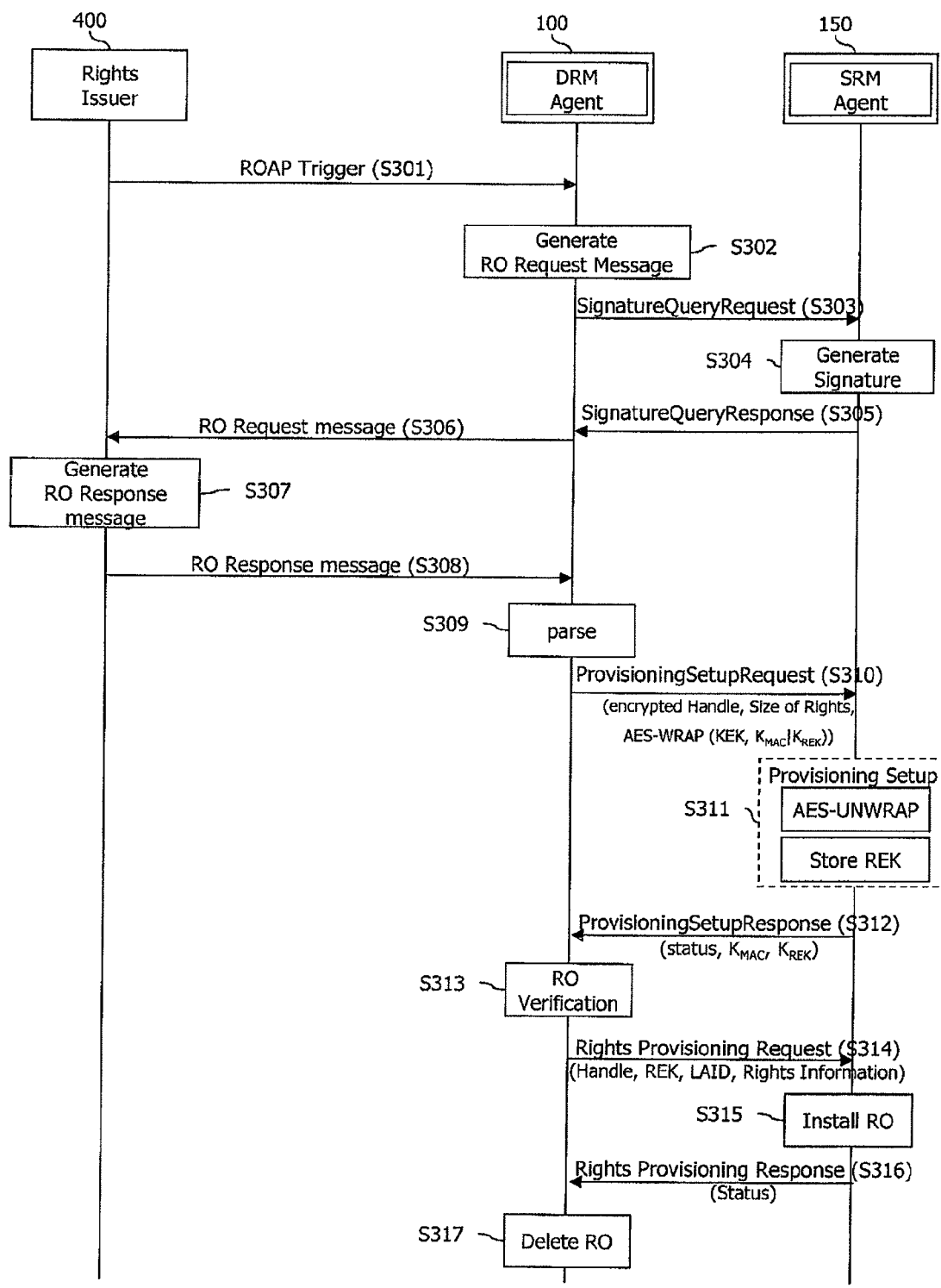
FIG. 8 is a flow chart illustrating the process of a method according to a fourth exemplary embodiment of the present invention.

FIG. 8 is a flow chart illustrating the process of a method according to a fourth exemplary embodiment of the present invention.

The fourth exemplary embodiment of the present invention as illustrated in FIG. 8 is the same as the third exemplary embodiment illustrated in FIG. 6, except for step S311, S312, S314. Thus, in the following description, step S311, S312, S314 will be focused and the description of steps S301 to S313 and S315 and S316 will apply correspondingly to the content of FIG. 6.

With reference to FIG. 8, in step S311, the SRM agent does not store the REK.

Also, referring to step S312 of FIG. 8. The SRM agent transmits $K_{MAC}$ and REK to the DRM agent.

With reference to FIG. 8, in step S314, the DRM agent includes Handle, REK, LAID, Rights Information in the Rights Provisioning Request message, and transmits the same to the SRM. Then, the SRM agent stores the Handle together with the Rights Information in the region for the Handle.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal). This will now be described with reference to FIG. 9.

Figure 9:
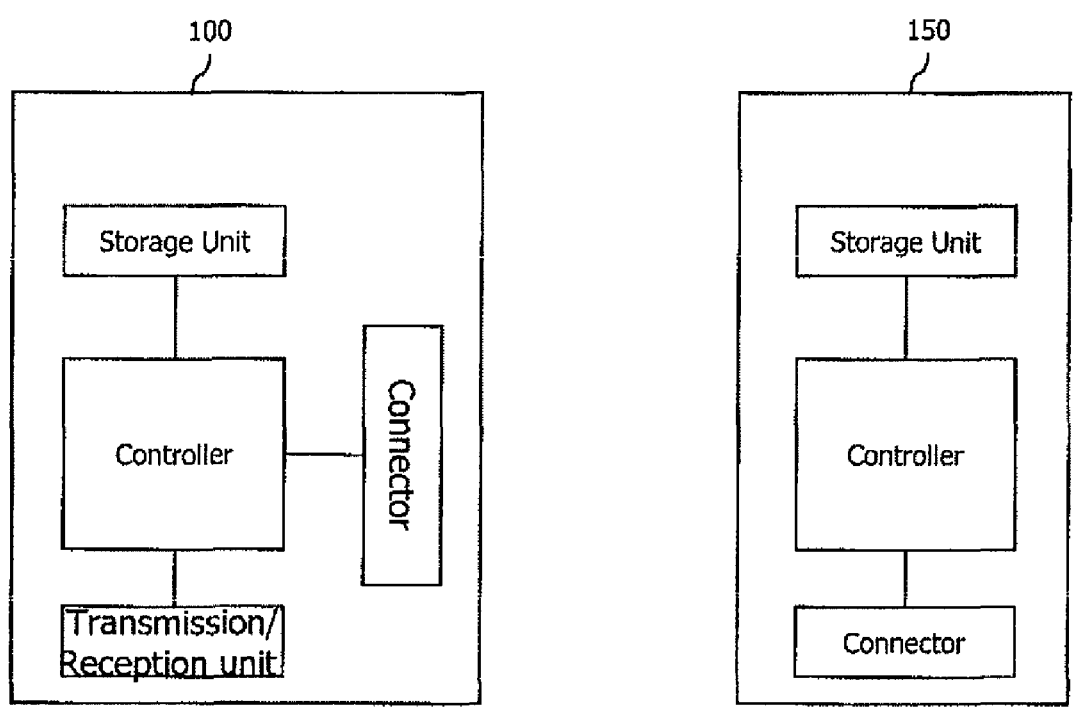
FIG. 9 is a schematic block diagram of a terminal 100 and an SRM 150 according to an exemplary embodiment of the present invention.

FIG. 9 is a schematic block diagram of a terminal 100 and an SRM 150 according to an exemplary embodiment of the present invention.

As shown in FIG. 9, the terminal includes a storage unit, a controller, a transmission/reception unit, a connector, and a controller. The memory card, namely, the SRM, includes a storage unit, a connector and a controller.

The connector connects the terminal 100 and the memory card, namely, the SRM.

The storage units store the method illustrated in FIGS. 4 to 8. The storage units store information of each received message.

Each controller controls the storage units and the transmission/reception units. In detail, the controllers execute the methods stored in the storage units, respectively. Each controller transmits the above-described signals via the transmission/reception units.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of receiving, by a terminal, a rights object (RO) from a rights issuer (RI) on behalf of a memory card in the terminal, comprising:
receiving, by the terminal and from the RI, a RO response message including a device ID, a signature and a protected RO including a wrapped key material, wherein the device ID indicates a memory card's ID,
wherein the wrapped key material within the protected RO, which is included in the RO response message received from the RI, was encrypted by using a key of the memory card, and
wherein the wrapped key material which was encrypted by using the key of the memory card comprises a MAC key and a RO Encryption key (REK);
determining if the device ID in the RO response message matches the memory card's ID inserted in the terminal;
if the device ID in the RO response message matches the memory card's ID which is different from the terminal's ID, extracting, by the terminal, from the protected RO, information to generate rights information to be stored on the memory card;
generating a handle for identifying rights with respect to the rights information to be generated,
wherein the handle is a random number and is unique within both the terminal and the memory card;
transmitting, from the terminal to the memory card, a provisioning setup request message, including the wrapped key material, the handle and information about a size of the rights information;
receiving, by the terminal from the memory card, a provisioning setup response message, the provisioning setup response message including a status indicating a result of processing the provisioning setup request message, and a verification key,
wherein the verification key was obtained, by the memory card, from the wrapped key material;
verifying the RO using the verification key;
transmitting a rights provisioning request message from the terminal to the memory card for installing the rights information in the memory card, the rights provisioning request message including the rights information and the handle,
wherein the handle is used to identify rights associated with the rights information stored in the memory card when the rights are to be consumed; and
receiving, by the terminal from the memory card, a rights provisioning response message including a rights information installation status.

2. The method of claim 1, wherein the step of verifying the RO is performed if it is determined that the status of the memory card provisioning setup indicates a successful setup of the memory card.

3. The method of claim 1, wherein the rights information comprises rights meta data, a RO container, and state information.

4. The method of claim 1, the step of generating the handle comprising:
encrypting the handle to be included in the provisioning setup request message.

5. The method of claim 1,
wherein is the MAC key a message authentication code key for integrity protection of the RO, and the REK is for confidentiality of the RO.

6. The method of claim 1, wherein the protected RO includes at least one of rights, and the wrapped key material.

7. The method of claim 1, further comprising:
generating, by the terminal, a RO request message without a signature;
sending, from the terminal to the memory card, a signature request message;
receiving, by the terminal from the memory card, a signature response message containing a signature of the memory card; and
sending, from the terminal, the RO request message including the signature of the memory card to the RI.

8. The method of claim 7, wherein the signature request message contains the RO request message.

9. The method of claim 7, wherein the signature response message contains a signature request message processing result.

10. The method of claim 7, further comprising:
receiving by the terminal a trigger message from the RI.

11. The method of claim 1, further comprising:
deleting the rights information from the terminal if the rights information installation status indicates that the rights information was successfully installed by the memory card.

12. The method of claim 10,
wherein the trigger message includes a corresponding device ID, and
wherein the step of generating a RO request message without a signature comprises generating the RO request message only upon verifying that the device ID of the trigger message matches the ID of the memory card.

13. The method of claim 1, wherein the verification key is a MAC key.

* * * * *